US008454253B2

(12) United States Patent
Cenky

(10) Patent No.: US 8,454,253 B2
(45) Date of Patent: Jun. 4, 2013

(54) KEYBOARD HAVING KEYS HORIZONTALLY ARRANGED IN THE ALPHABETICAL ORDER OF THE ENGLISH LANGUAGE

(76) Inventor: Frank Andrew Cenky, Sandy Springs, GA (US)

(*) Notice: Subject to any disclaimer, the term of this patent is extended or adjusted under 35 U.S.C. 154(b) by 0 days.

(21) Appl. No.: 13/292,652

(22) Filed: Nov. 9, 2011

(65) Prior Publication Data

US 2012/0114406 A1 May 10, 2012

Related U.S. Application Data

(60) Provisional application No. 61/412,214, filed on Nov. 10, 2010.

(51) Int. Cl.
*G06F 3/02* (2006.01)
(52) U.S. Cl.
CPC .................................. *G06F 3/02* (2013.01)
USPC ............................................ 400/486; 400/472
(58) Field of Classification Search
CPC ........................................................ G06F 3/02
USPC ............................................ 400/472, 486, 489
See application file for complete search history.

(56) References Cited

U.S. PATENT DOCUMENTS

| 5,358,343 | A | | 10/1994 | Klauber |
| 5,481,263 | A | | 1/1996 | Choi |
| 5,680,158 | A | * | 10/1997 | Yoshida et al. ............... 345/168 |
| 6,851,877 | B1 | | 2/2005 | Lirbhold |
| 6,900,794 | B1 | * | 5/2005 | San ............................... 345/168 |
| 7,216,588 | B2 | | 5/2007 | Suess |
| 7,656,317 | B2 | | 2/2010 | Salman et al. |
| 2003/0026637 | A1 | * | 2/2003 | Fu ................................. 400/472 |
| 2006/0257191 | A1 | | 11/2006 | Artus |
| 2008/0074395 | A1 | * | 3/2008 | Rak ............................... 345/168 |
| 2008/0075517 | A1 | | 3/2008 | Vuong |
| 2011/0206437 | A1 | | 8/2011 | Baker |
| 2011/0210914 | A1 | * | 9/2011 | Kitagawa et al. ............. 345/157 |

FOREIGN PATENT DOCUMENTS

GB         2366760 A   *  3/2002
WO  WO 2009124351 A1  * 10/2009

OTHER PUBLICATIONS

Micromax Q5 Review, from http://teleguru.in/2010/02/micromax-launches-dual-sim-phone-q5/, user comment from Vvigness; posted Dec. 13, 2010.*
Micromax Q5 picture, from http://archive.techtree.com/techtree/jsp/article.jsp?article_id=112834&cat_id=614; Sep. 13, 2010.*
Blackberry Forum, from http://supportforums.blackberry.com/t5/BlackBerry-Curve/Weird-Icon/td-p/41961; user comment from Bifocals; posted Sep. 4, 2008.*

* cited by examiner

*Primary Examiner* — Daniel J Colilla
(74) *Attorney, Agent, or Firm* — J.T. Hollin, Attorney at Law, PC

(57) ABSTRACT

Disclosed is an arrangement of keypads, entitled Cenky Keyboards, which are uniquely-designed keyboard layouts that utilize data entry keypads having the letters of the English language arranged in natural alphabetical order. This arrangement, or layout, is applicable to electronic hand-held or desktop computing, typing, and calculating devices, and assists users in locating letters and typing more efficiently. Letters A through Z are arranged alphabetically on the keyboard, either horizontally in rows or vertically in columns, thus facilitating quick typing. This product may be used in conjunction with any i-pad, smart phone, computer, or other devices, including those with fixed keyboards, touch screens, and slider keyboards.

2 Claims, 6 Drawing Sheets

KEYBOARD HAVING KEYS HORIZONTALLY ARRANGED IN THE ALPHABETICAL ORDER OF THE ENGLISH LANGUAGE

REFERENCE TO RELATED APPLICATION

This application claims the benefit of priority of U.S. Provisional Application No. 61/412,214 filed on Nov. 10, 2010, and said provisional application is fully incorporated herein by reference.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION (1) Field of the Invention

The inventive concepts presented herein generally are concerned with the layout of keyboards utilized as a data keypad interface for the entry of characters and data into electronic computing devices. Such data is commonly represented by letters of the English alphabet, Roman numerals, and other symbols and characters. More particularly, the inventive concept herein presents an alphabetically-arranged layout to facilitate use and access to the keys by persons who have not developed proficiency nor had courses of learning in typing or keyboard skills on the standard QWERTY-style keyboards.

Existing smart phone keyboards, computer keyboards, and touch screens are referred to as "QWERTY" keyboards. Due to the order in which the English letters are arranged in the QWERTY keyboards it can be difficult for an untrained typist to locate a specific letter, because the letters seem to be arranged in a nonsensical order. This can lead to misspelled words or unintended insertion of characters. The user can thereby easily become frustrated with the amount of time it takes to type a text message or email. A more efficient option is needed.

Another problem with the QWERTY type keyboards is that it takes non-proficient typists a certain length of time to acquire visual citing of specific characters on the keyboard, thus using valuable seconds for almost every key strike. However, a sub-conscious awareness of the alphabetical order of the English alphabet will more readily enable an unskilled typist to locate letters and characters with respect to their keys.

(2) Description of the Related Art

The following summary present a variety of devices having designs of keyboard arrangements that fall within the general concept of the inventive concept disclosed herein.

US patent application publication 2011/0206437 (Aug. 25, 2011) discloses a one-handed keyboard for a hand held computing device. The keyboard comprises an array of keys representing characters of an alphabet of a language. In one aspect, the array comprises keys representing frequently used vowel characters of the alphabet arranged together in series. The device contains keys representing frequently used consonant characters of the alphabet arranged adjacent to the keys representing vowel characters. Keys representing infrequently used consonant characters of the alphabet are arranged in positions remote from the keys representing vowel characters.

U.S. Pat. No. 7,656,317 (Feb. 2, 2010) discloses an apparatus with a first plurality of input keys. Some of the first input keys may be associated with both a numeric value and a first set of alphabetic values and arranged in a first alphabetic keypad layout. The apparatus is further provided with a second plurality of input keys, positioned adjacent to the first plurality of input keys, and being associated with at least one alphabetic value. Some keys of the second plurality of input keys may be arranged in a second alphabetic keypad layout different from the first alphabetic keypad layout.

In U.S. patent application publication #2008/0075517 A1 (Mar. 27, 2008) the inventor designed a key arrangement including a plurality of keys associated with alphabetic characters that include consonants and vowels. The plurality of consonants is arranged in a grid pattern having at least five keys. The consonants are arranged in a standard keyboard format and numbers are also associated with the keys.

U.S. Pat. No. 7,216,588, (May 15, 2007, inventor Suess, D.) presents a method for designing a data-entry interface layout of Roman alphabet letters thereon and involves the transposition of the letters on a three-row QWERTY keyboard into six rows. A letter (optimally every other letter) within a first, second, or third row of said three-row QWERTY keyboard is placed in an additional row substantially below an adjacent letter of said first, second, or third row.

US patent application publication #2006/0257191 (Nov. 16, 2006) is a keyboard for a computer comprising a plurality of keys arranged in two groups, one for the left hand and one for the right hand. According to the invention, each of the groups, for the four fingers except the thumb, comprises a basic key (B1 B2 B3 B4 B7 B8 B9 B10) and two adjacent keys (AE1 . . . , AII . . . ) aligned either side thereof; and for the thumbs a basic key (B5 B6), all said basic and adjacent keys together representing the 26 letters of the alphabet.

U.S. Pat. No. 6,851,877 (Jan. 8, 2005) discloses a keyboard layout comprising a plurality of user selectable keys that are arranged in an essentially diamond-shaped pattern about a central key or point. Each key is at a minimum distance from the central point, relative to each other key. The keys representing the characters of the alphabet may be arranged alphabetically.

U.S. Pat. No. 5,481,263 (Jan. 2, 1996) discloses a keyboard for an electronic processor comprising two separate keyboard units for operation by the left and right hands, respectively. There are keys at locations corresponding to those of the left hand and right hand operational sides of a conventional, touch-typing keyboard. In one embodiment, the keyboard units can be folded for packing in stacked relation for "pocketability"

U.S. Pat. No. 5,358,343 (Oct. 25, 1994) presents a method for controlling cursor functions on a touch typing keyboard, comprising activation of the cursor control functions via transverse force applied comfortably by thumb movement. Such cursor activation is designed to be accomplished more easily and ergonomically effectively because it is claimed to be performable without averting the eyes from the text copy.

BRIEF SUMMARY OF THE INVENTIVE CONCEPT

The inventive concept prevented herein, entitled Cenky Keyboards, comprises uniquely-designed data entry keypad layouts that utilize a keypad matrix having the letters of the English language arranged in alphabetical order. This arrangement, matrix, or layout, assists users in locating letters and typing more efficiently. Letters A through Z are arranged alphabetically on the keyboard, either horizontally or vertically, to facilitate quick typing. The device may be used in conjunction with any smart phone, computer, calculator, or other devices that utilize data entry mechanical or electronic keypads for entering the English language, numerals and symbols, including those devices with fixed keyboards, touch screen keypads, and slider keyboards.

DETAILED DESCRIPTION OF THE INVENTIVE CONCEPT

The objects, features, and advantages of the concept presented in this application are more readily understood when referring to the accompanying drawings. The drawings, totaling six figures, show the basic functions of the two embodiments of the Cenky Keyboards. In the several figures, like reference numbers are used in each figure to correspond to the same component as may be depicted in other figures.

Figure 1:
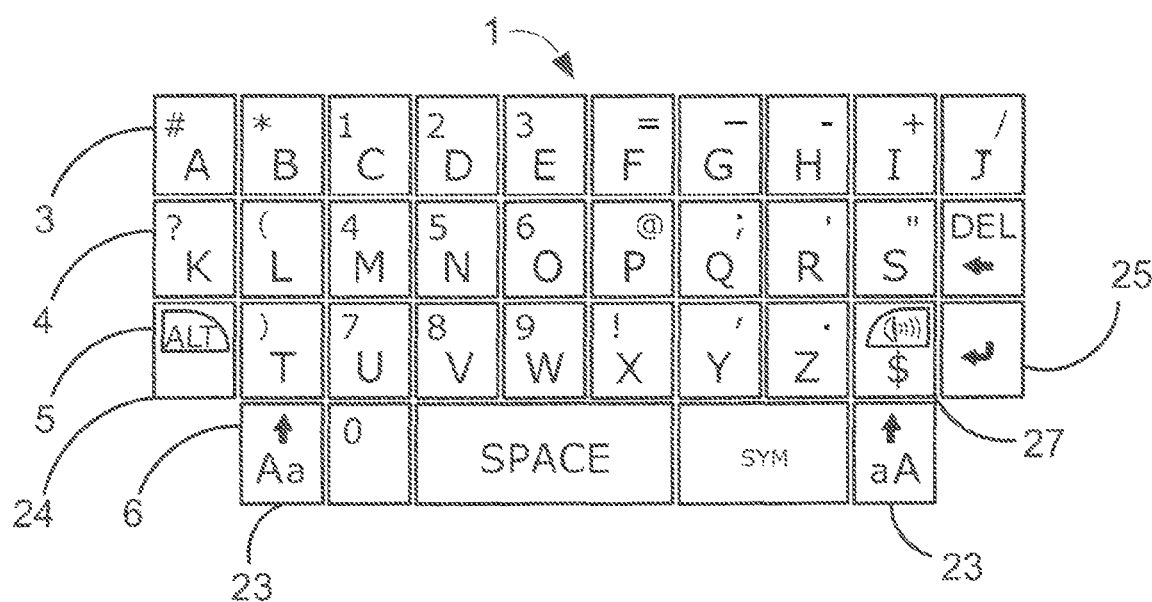
FIG. 1 presents the primary, or preferred embodiment of the Cenky keyboard layout, with English letters arranged horizontally from left to right in a matrix of three rows by ten columns and a fourth auxiliary row.

FIG. 1 shows the primary keyboard 1, or preferred embodiment of the Cenky Keyboard. The primary keyboard 1 comprises four horizontal rows: a topmost first row 3, a second row 4, a third row 5, and a fourth auxiliary row 6, as the bottom-most row. The top three rows each contain keys displaying ordered English letters and also include their co-located "alternate" characters. The letters are ordered in an alphabetic sequential arrangement horizontally from left to right, beginning with the top-most first row 3, which contains letters A through J. The letters K through S are alphabetically arranged from left to right beginning with the first key of the second row 4. Letters T through Z are horizontally contained in the third row 5, beginning with the second key of the third row 5. The fourth row 6 consists of five keys, comprising from left to right, an "Aa" or capitalization shift key 23, the numeral zero, a "space" bar, a "sym" key for accessing a variety of symbols that may be electronically stored on the associated device, and a second capitalization shift key 23.

Figure 2:
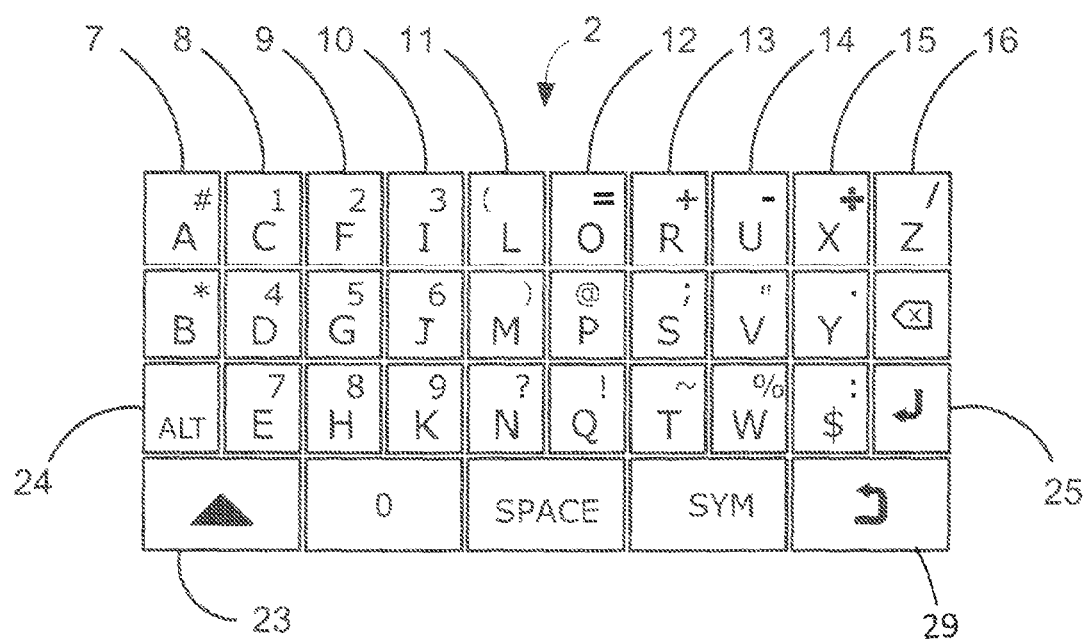
FIG. 2 displays an alternate Cenky keyboard layout, with English letters arranged vertically from top to bottom in a matrix of ten columns by three rows, with the inclusion of a fourth auxiliary row.

FIG. 2 illustrates an alternate layout 2 of the Cenky Keyboard, having a matrix comprising ten columns (7, 8, 9, 10, 11, 12, 13, 14, 15, and 16) comprising three keys each, which form three rows. A fourth auxiliary row consists of five keys, comprising from left to right, a solid triangle functioning as a capitalization shift key 23, the numeral zero, a "space" bar, a "sym" key for accessing a variety of symbols that may be electronically stored on the associated device, and a return key 29.

As shown in FIG. 2, the English alphabet is arranged in alphabetical order, however on a vertical orientation in adjacent columns and from the top to the bottom of each column, progressing from the leftmost column to the far right column. Column one 7 contains the letters A and B; column two 8 has letters C, D, E; column three 9 displays letters F, G, and H; column four 10 contains the letters I, J, and K; column five 11 has letters L, M, and N; column six 12 displays letters O, P, and Q; column seven 13 contains the letters R, S, and T; column eight 14 has letters U, V, and W; column nine 15 displays letters X and Y; and lastly, column ten 16 contains the letter Z as the topmost key of the matrix.

A primary objective of this inventive concept is to provide a data entry interface, or keyboard, for small electronic devices. As shown in FIG. 1, the keys of the primary Cenky Keyboard 1 are configured with combinations of symbols, character selections, and letters that differ from the combinations found in standard QWERTY keyboards. The primary Cenky keyboard 1 as shown in FIG. 1 may also be adapted to operate as the integral data entry keypad for a cell phone 17 or smart phone, depicted in FIG. 3. Further, the primary Cenky Keyboard 1 may easily be utilized as a slider keyboard 19 as depicted in FIG. 5.

Figure 4:
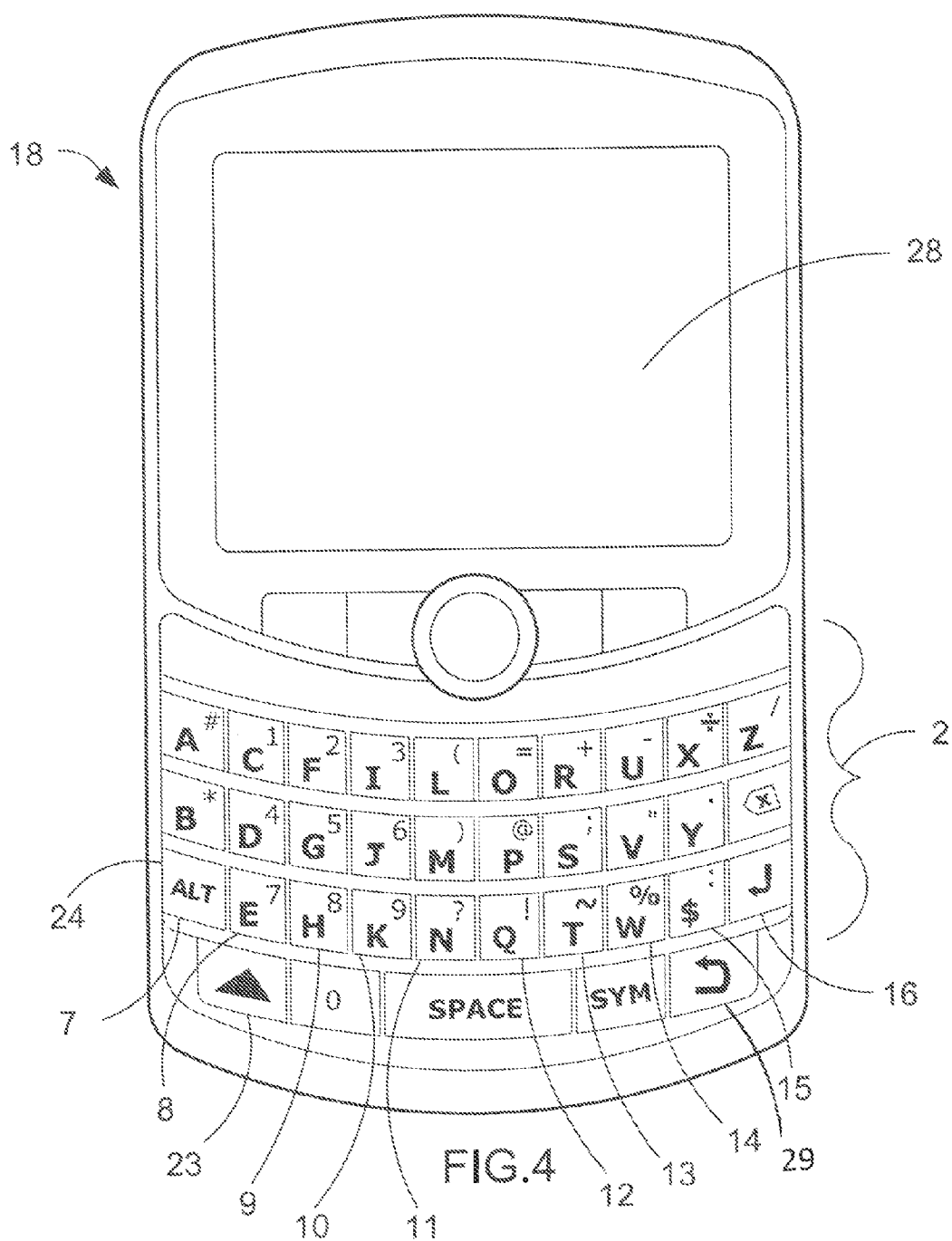
FIG. 4 shows a typical smart phone having a data entry pad comprising the alternate Cenky keyboard layout.

In viewing FIG. 2, the keys of the alternate Cenky Keyboard 2 are shown to be configured with combinations of symbols, character selections, and letters that differ from both standard QWERTY keyboards and from the primary Cenky keyboard 1. However, the alternate Cenky Keyboard 2 as shown in FIG. 2 may also be adapted to operate as the integral keyboard for a cell phone 18 or smart phone, as shown in FIG. 4. Further, the alternate Cenky Keyboard 2 is capable of being utilized as a slider keyboard 20 as depicted in FIG. 6.

Figure 3:
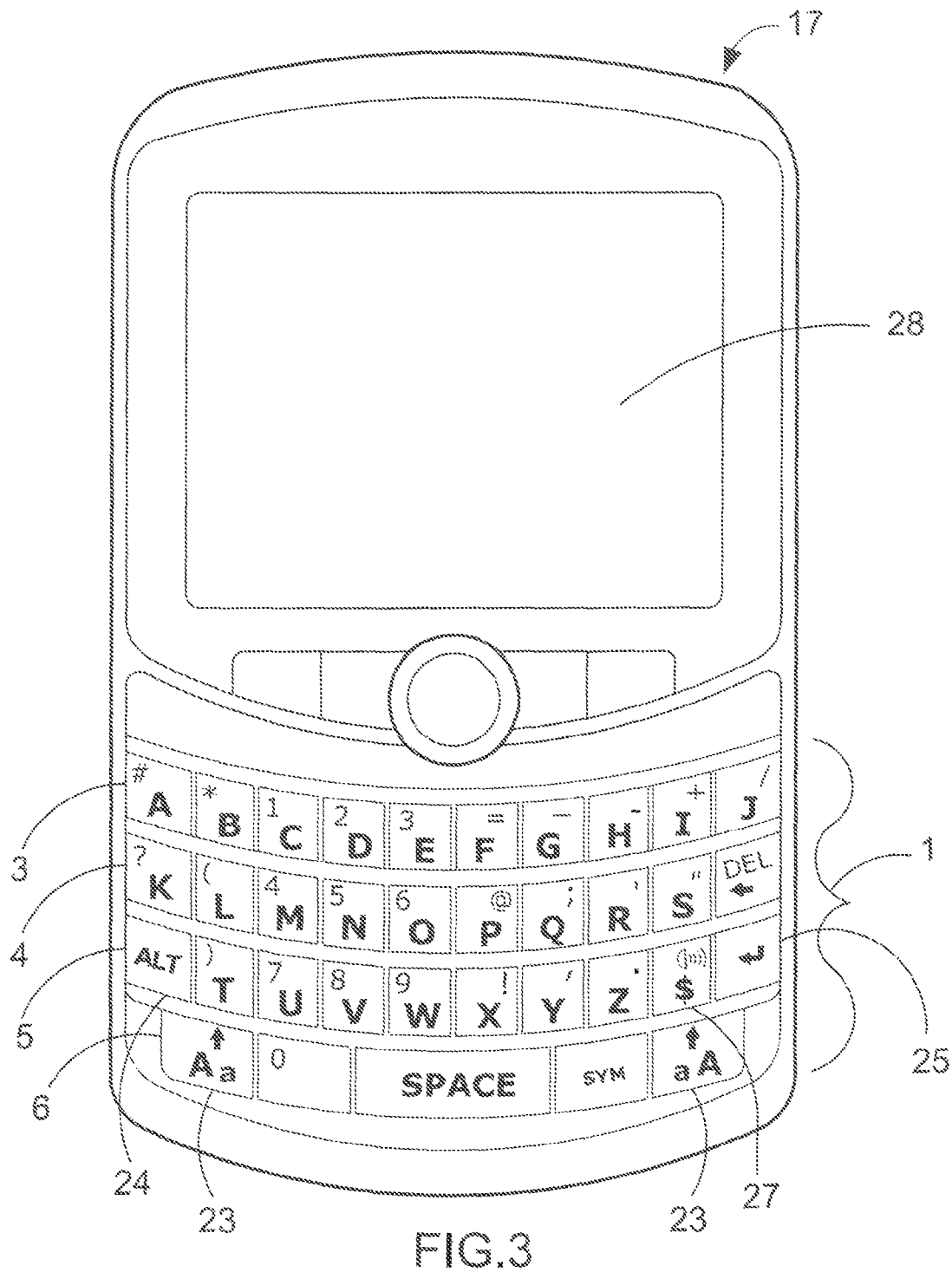
FIG. 3 presents a typical smart phone or cell phone having a data entry pad comprising the primary Cenky keyboard layout.
Figure 5:
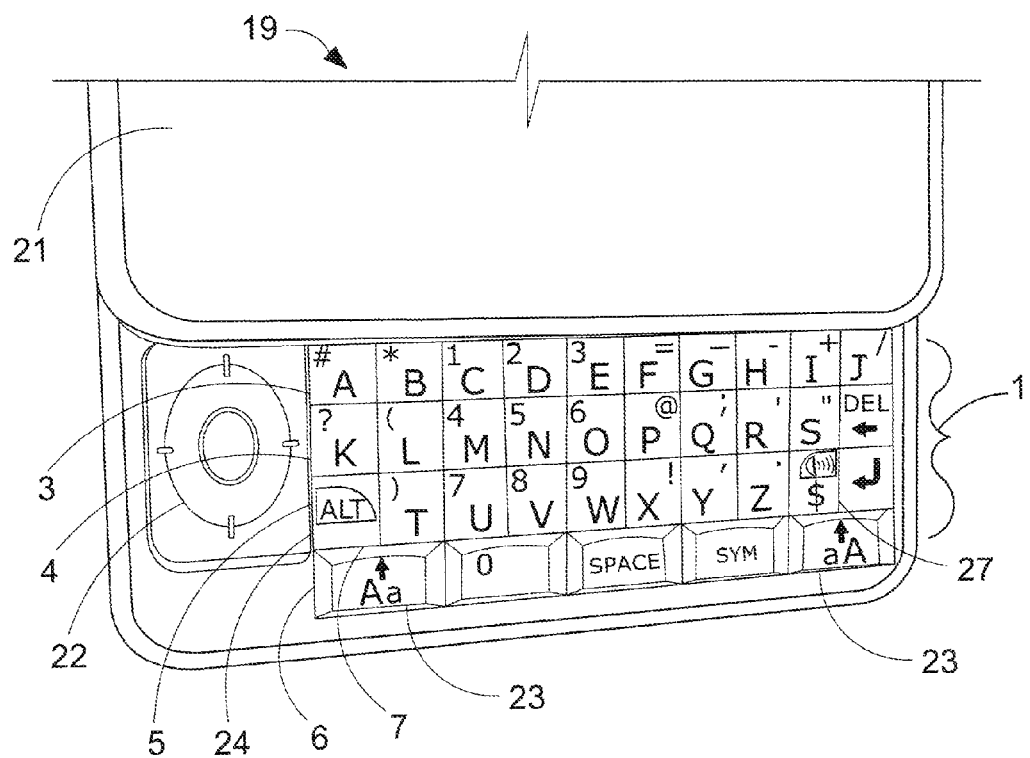
FIG. 5 illustrates an electronic device having a slider-type keyboard comprising the primary Cenky keyboard layout.

In observing FIGS. 1, 3, and 5, which all display different uses of the primary Cenky Keyboard 1, there is observed, on the first key of the third row 5 of each figure, a key labeled "ALT" 24. The "ALT" 24 key is used to change the typing input from the larger-sized image on a particular key, to the character or symbol represented by the smaller-sized display co-located on the same key. In this manner, the keys having letters A through J in the first row 3 may be used to type their co-located symbols or numerals. For clarity and illustrative purposes, these co-located symbols (shown in brackets (1 for clarity and illustrative purposes) [#], [*], [1], [2], [3], [=], [_], [−], [+], and [/]. As an example, any time "ALT" 24 is pressed immediately prior to, or simultaneously with, depressing any of the "letter keys" (containing letters A through J), their co-located symbols or numerals will be typed or entered.

Again, referring to FIGS. 1, 3, and 5, the keys having letters K through S in the second row 4 may be used to type their co-located symbols or numerals [?], [(], [4], [5], [6], [@], [;], ['], and ["], respectively, at any time "ALT" 24 is pressed immediately prior to, or simultaneously with, depressing any of the respective keys containing letters K through S. In a similar fashion, when "ALT" 24 is pressed in conjunction with depressing the letter keys T through Z, and inclusive of the dollar sign [$], shown in the third row 5, the symbols or numerals typed are [)], [7], [8], [9], [!], [,], [.], and an icon representing the means of controlling the volume of the device, respectively. The last key shown in the third row 5 is an icon representing the key which performs the function of "Enter" normally used on a standard QWERTY or computer keyboard. In viewing FIG. 5, a slider keyboard, 19 having the primary Cenky Keyboard 1, there is also shown a cursor mover 22 for fingertip control of an on-screen cursor, along with a contemplated touch-screen monitor 21.

Figure 6:
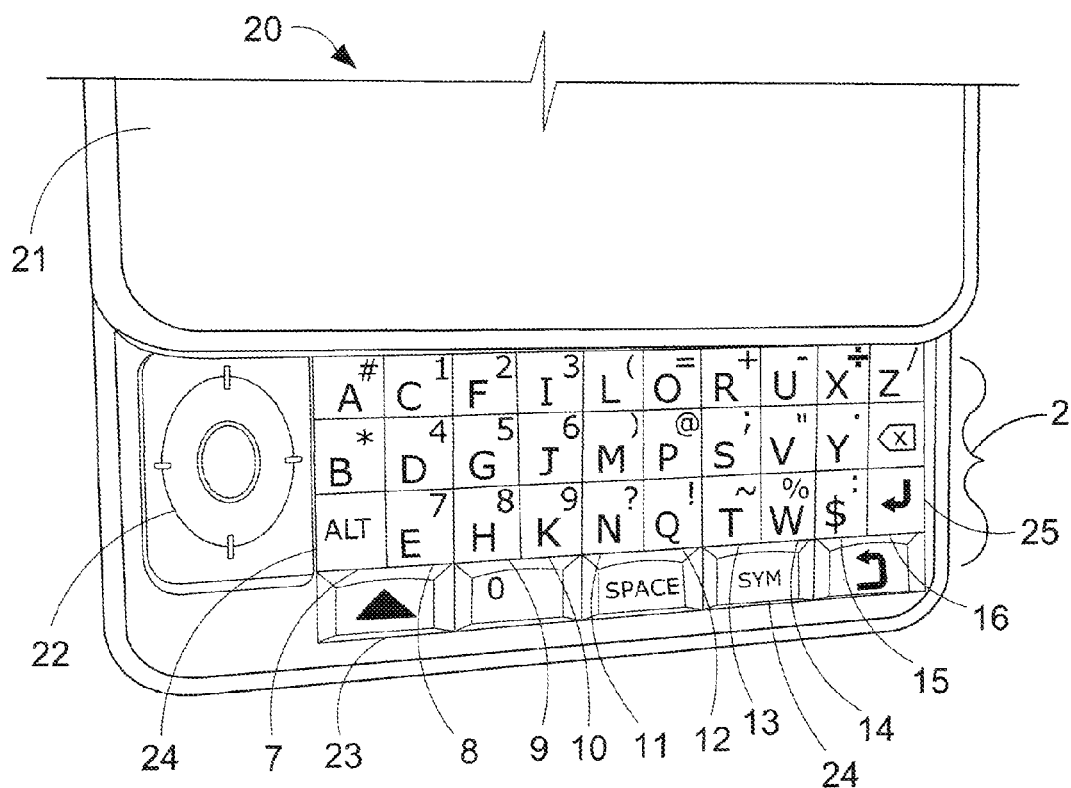
FIG. 6 illustrates an electronic device having a slider-type keyboard, comprising the alternate Cenky keyboard layout.

As we view FIGS. 2, 4, and 6, which all display different uses of the alternate Cenky Keyboard 2, there is shown, on the third key of column one 7 of each figure, a key labeled "ALT" 24. As on the primary Cenky Keyboard 1, the "ALT" 24 key is used to change the typing input from that shown by the larger-sized image on a particular key to the character or numeral represented by the somewhat smaller-sized display co-located on the same key. To illustrate, the keys displaying letters A and B may be alternatively typed to produce [#] and [1] respectively; C, D, and E are used to type [1] [4] [7], respectively, keys displaying F, G, and H, are used to also type [2] [5] [8], respectively; keys I, J, K may be used to type [3] [6] [9] respectively; keys L, M, N are alternatively used to type [(] [)] and [?)]; keys O, P, and Q may also type [+] [@] and [!] respectively; keys R, S, T may be used to type [+] [;] and [~] respectively; keys U, V, W, may also type [-] ["] and [%] respectively, and keys X, Y, and the dollar sign, S, may be alternatively used to type [+] [.] and [:] respectively. In column eleven 16, the letter Z may be alternatively typed to produce M.

Again in reference to FIGS. 2, 4, and 6, a darkened triangle 23 is used to indicate which shifts the typing input from a lower case letter to a capital letter. The third key in column eleven 16 displays an icon representing the key which performs the function of "Enter" normally used on a standard QWERTY or computer keyboard. FIG. 6, a slider keyboard device 20 utilizing the alternate Cenky Keyboard 2, further displays a cursor-mover 22 for fingertip control of an on-screen cursor, along with a contemplated touch-screen monitor 21.

The embodiments herein are presented by way of example only, and not as a limitation to the scope of the inventive concept. Numerous variations, changes, and substitutions may occur or be suggested to those skilled in the art without departing from the intent, scope, and totality of the instant inventive concept. Such variations, changes, and substitutions may involve other features which are already known per se and which may be used instead of, or in addition to features already disclosed herein. Accordingly, it is intended that this inventive concept not be limited by the scope of the accompanying claims.

What is claimed is:

1. An electronic device, such as smart phones and computers, having a data entry pad comprising an arrangement of individual keys wherein said keys are labeled according to the input function of each key, said keys being activated by the pressing of said keys to access letters of the English language, numerals, and symbols that are electronically stored within said device, and thereby making electronic data entries in accordance with the labeling of said keys, the arrangement of the individual keys further comprising:

a sequential, natural ordering of the keys having English alphabet letters A through J arranged horizontally from left to right, in a first row of said data entry pad;

a sequential, natural ordering of the keys having English alphabet letters K through S, followed by a "DEL" key, arranged horizontally in a second row of said data entry pad;

an arrangement of keys, beginning with an "ALT" key, followed by a sequential, natural ordering of the English alphabet letters T through Z followed by the dollar sign, being arranged horizontally in a third row of said data entry pad, wherein said dollar sign, in conjunction with the pressing of the "ALT" key, controls the volume of the respective electronic device; and a fourth horizontal row consisting of five keys further comprising, in order, a first capitalization shift key, the numeral zero, a "SPACE" bar, a "sym" key for accessing a variety of symbols that may be electronically stored on the associated device, and a second capitalization shift key; wherein said "ALT" key when depressed simultaneously with other specific keys, is a means for the selection and typing of a different character or function, wherein, (i) letter keys A through J, when pressed in conjunction with said "ALT" key, may be used to type [#], [*], [1], [2], [3], [=], [_], [-], [+], and [/] respectively, (ii) letter keys K through S, when pressed in conjunction with said "ALT" key, may be used to type [2], [(], [4], [5], [6], [@], [;], ['], and ["], respectively;

(iii) letter keys T through Z, when pressed in conjunction with said "ALT" key, may be used to type [)], [7], [8], [9], [!], [,], [.], respectively; and further, said "DEL" key, when depressed, provides an erasing function, on said electronic devices, of any previously entered letters, symbols, or numbers.

2. An electronic device, such as smart phones and computers, having a data entry keypad as in claim 1, further comprising a cursor mover for fingertip control of an on-screen cursor wherever said cursor is provided on said electronic devices.

* * * * *